(12) United States Patent
Ciancio-Bunch (10) Patent No.: US 10,135,766 B2
(45) Date of Patent: Nov. 20, 2018

(54) SYSTEM AND METHOD FOR EVALUATING DOMAINS TO SEND EMAILS WHILE MAINTAINING SENDER REPUTATION

(71) Applicant: ExactTarget, Inc., Indianapolis, IN (US)

(72) Inventor: James Michael Ciancio-Bunch, Indianapolis, IN (US)

(73) Assignee: SALESFORCE.COM, INC., San Francisco, CA (US)

( * ) Notice: Subject to any disclaimer, the term of this patent is extended or adjusted under 35 U.S.C. 154(b) by 75 days.

(21) Appl. No.: 14/488,903

(22) Filed: Sep. 17, 2014

(65) Prior Publication Data
US 2015/0082451 A1    Mar. 19, 2015

Related U.S. Application Data

(60) Provisional application No. 61/878,747, filed on Sep. 17, 2013.

(51) Int. Cl.
   *G06F 7/04*      (2006.01)
   *G06F 17/30*     (2006.01)
   (Continued)

(52) U.S. Cl.
   CPC .......... *H04L 51/12* (2013.01); *H04L 61/1511* (2013.01); *H04L 61/307* (2013.01); *H04L 63/101* (2013.01)

(58) Field of Classification Search
   CPC ....... H04L 61/307; H04L 12/58; H04L 51/12; H04L 12/585; H04L 12/5875;
   (Continued)

(56) References Cited

U.S. PATENT DOCUMENTS

2005/0228899 A1* 10/2005 Wendkos .............. H04L 12/585
                                                                709/232
2006/0031319 A1*  2/2006 Nelson ................. G06Q 10/107
                                                                709/206
(Continued)

FOREIGN PATENT DOCUMENTS

GB           2462456 A   *   2/2010   ............. G06F 21/51

OTHER PUBLICATIONS

Pan et. al., Anomaly Based Web Phishing Page Detection, 2006, IEEE.*

(Continued)

*Primary Examiner* — Trong H Nguyen
(74) *Attorney, Agent, or Firm* — Morris & Kamlay LLP (57) ABSTRACT

Systems, device and techniques are disclosed for evaluating domains to send emails while maintaining sender reputation. Registration records of a domain are retrieved. The registration records include a mail server record and one or more records linking the domain to another domain or to an IP address. The mail server record is verified to be associated with a domain that is not on a black list. A webpage is retrieved from a website associated with the one or more records linking the domain to another domain or to an IP address. The webpage is compared to webpages for websites that are on white lists. An electronic communications sending strategy is determined based on verifying that the mail server record is associated with a domain that is not on a blacklist and comparing of the webpage to webpages for websites that are on one or more white lists.

19 Claims, 3 Drawing Sheets

(51) Int. Cl.
*H04N 7/16* (2011.01)
*H04L 12/58* (2006.01)
H04L 29/12 (2006.01)
H04L 29/06 (2006.01)

(58) Field of Classification Search
CPC ............ H04L 61/1511; H04L 12/1877; H04L 12/5885; H04L 51/34; H04L 63/101
See application file for complete search history.

(56) References Cited

U.S. PATENT DOCUMENTS

| | | | |
|---|---|---|---|
| 2007/0055749 A1* | 3/2007 | Chien | G06F 21/645 709/219 |
| 2009/0210416 A1* | 8/2009 | Bennett | G06F 17/30241 |
| 2010/0057556 A1* | 3/2010 | Rousso | G06Q 30/02 705/14.44 |
| 2014/0358939 A1* | 12/2014 | Simon | G06Q 10/107 707/748 |

* cited by examiner

SYSTEM AND METHOD FOR EVALUATING DOMAINS TO SEND EMAILS WHILE MAINTAINING SENDER REPUTATION

PRIORITY

This application claims the benefit of U.S. Provisional Application No. 61/878,747, filed Sep. 17, 2013, the disclosure of which is incorporated by reference in its entirety.

BACKGROUND

Email Service Providers (ESPs) may provide email building and sending services to their clients. Clients may request the creation and execution of marketing campaigns that require the sending of emails to a large number of users. Some of the users may have never received an email from the ESP. The ESP may request that its clients receive opt-in consent from customers before sending email to the customers, but the ESP may not be able verify that opt-in consent was received or that email addresses provided by a client are correct.

An ESP may send emails for a wide range of clients, from the same or similarly situated network infrastructure. A poor sender reputation may have a negative impact on an ESP's business. For example, if an ESP sends one or more emails to a Spam trap, an incorrect recipient, or a recipient who has not consented to receiving emails from the ESP or its clients, the ESP may experience negative business repercussions due to, for example, a poor sender rating or being placed on one or more commonly used block lists.

Building and sending emails to a vast set of email recipients may be a complex computational task. An ESP that builds and sends emails destined for a domain that cannot properly receive emails, or to email recipients who did not consent to receiving emails may waste computational resources that could be used for more appropriate email building and sending tasks.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Techniques disclosed herein enable an ESP or any email sender to perform verification and evaluation techniques to determine the likelihood of success of sending emails within an email campaign to recipients based on each recipient's domain. As used herein, a domain refers generally to an identification string that may define a realm of administrative ownership within the Internet or other computer network. A domain may refer to a fully-qualified domain name or a portion of a domain name, or to another identifier that may or may not be associated with a domain name. The techniques include an ESP system that seeks to verify domain names from email addresses to be emailed on behalf of a client by an ESP and send email using the ESP's primary emailing infrastructure only to those domains that can be verified. The techniques disclosed herein enhance email sending by allowing an ESP to avoid sending emails to email addresses that include domains which may be risky, malicious, malformed, or improperly configured to receive email. This may prevent the ESP from experiencing an email sender ratings downgrade or being added to spam lists, block lists, or black lists.

The techniques disclosed herein enable verifying the domains of email addresses to which a client has requested an ESP send an email, allowing the ESP to avoid email sender ratings downgrades and black listing better than traditional techniques. Verifying email address domains may enable an ESP to use less computational resources building emails to be sent out and less bandwidth when sending out emails as the ESP may not need to send emails to domains that cannot be properly verified. As a specific example, a client may provide an ESP with a list of four thousand email addresses to which the client wishes for the ESP to send an email. Using the techniques disclosed herein, the list of four thousand email addresses may be reduced to three thousand five hundred email address based on verification of the domains associated with the email addresses. The number of emails sent out by the ESP may be reduced and the ESP may avoid sending emails to domains which may be risky, malicious, malformed, or improperly configured to receive email, preventing the ESP from experiencing an email sender ratings downgraded or being placed on a block list. The reduction may result in processing and caching saving. The reduction in number of email addresses may allow faster processing times, faster communication distribution, reduction in memory and/or cache, reduction in bandwidth usage, or the like.

Figure 1:
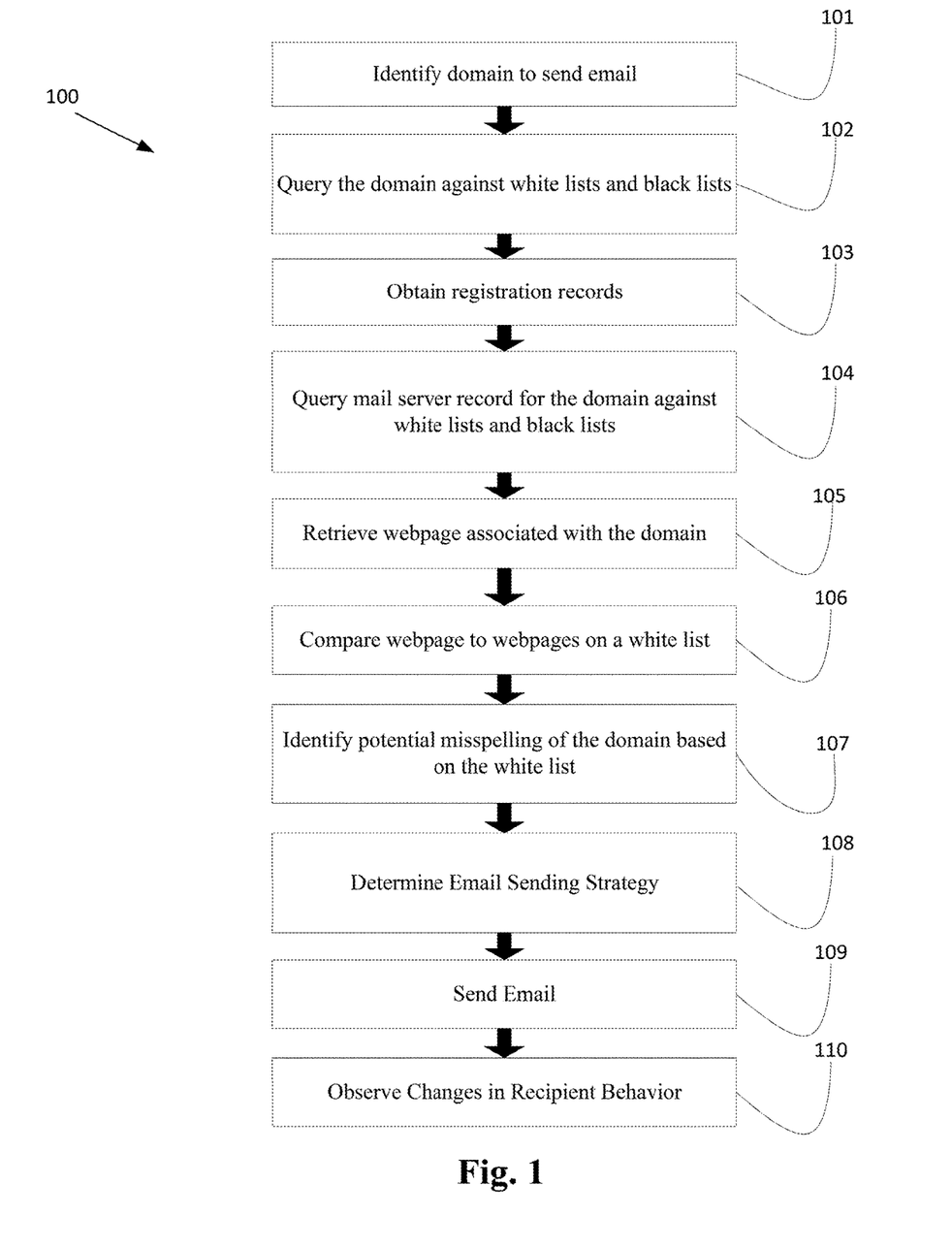
FIG. 1 shows an example process for obtaining information on and verifying a domain, according to an implementation of the disclosed subject matter.

According to implementations of the disclosed subject matter, as shown in FIG. 1, emails may be distributed to email addresses based on verification of domains associated with the email addresses, as shown by the flowchart 100. As shown at step 101, a domain to which an email is to be sent may be identified. At step 102, the domain may be queried against white lists and black lists. At step 103, registration records may be obtained and verified. At step 104 a mail server record for the domain may be queried against white lists and black lists. At step 105, a webpage associated with a domain may be retrieved. At step 106, the webpage associated with a domain may be compared against a white list of domains and associated webpages. At step 107, potential misspellings for a domain may be identified using a white list of known domains. At step 108, a strategy for sending an email may be determined. At 109, an email may be sent. At 110, a change in the behavior of the recipient of an email may be observed.

According to implementations of the disclosed subject matter, at step 101 in FIG. 1, a domain to which an email is to be sent may be identified. An entity, for example, a client of an ESP, may request that an ESP send an email to a number of recipients with email addresses associated with a multitude of domains. The ESP may use the same infrastructure to send emails to many different domains on behalf of a number of different clients. The ESP may want to avoid sending email to an email address that may be a spam trap, may be incorrect due to, for example, a typographical error, or may otherwise cause the domain names or Internet Protocol addresses associated with infrastructure, such as servers used by the ESP, to have their email sender rating lowered or be added to a block list that may cause future emails sent by the ESP to blocked. The ESP may have never sent an email to an email address provided by the client, or may not have sent an email to the email address in a long time. The ESP may wish to verify the authenticity of the domain associated with the email address, or gather more information about the domain before sending an email to an email address associated with the domain.

The ESP may identify which domains to verify or gather more information about in step 101 based on previously known statistical information stored by the ESP about sending emails. The ESP may retain, for example, in a database, information associated with the success or failure of emails sent out to various email addresses by the ESP on behalf of clients. The ESP may retain error messages and error codes received by the ESP after sending out emails, click and open rates by the recipients of emails, the number of emails sent to different domains, and other associated information. The ESP may evaluate and aggregate stored information for a domain to determine whether a domain should be verified or whether the ESP should obtain more information for the domain.

A client may request that an ESP send an email to a recipient list provided by that client that includes four thousand email addresses. The four thousand email addresses may be determined to be associated with six hundred domains. The ESP may evaluate and aggregate stored information for each of the six hundred domains, and may determine that the ESP has successfully sent email to five hundred and ninety out of the six hundred domains in the past. The stored information may allow the ESP to verify the five hundred and ninety domains. The ESP may select the remaining ten domains to obtain further information on, as described in steps 103, 104, 105, 106, and 107, before verifying, as the ESP may have sent only a few or no emails to email addresses associated with the domains.

According to implementations of the disclosed subject matter, a domain may be queried against white lists and black lists at step 102. The ESP may review commonly known, or internally maintained, information sources, including black lists which may include negative associations for a domain such as spam lists, spam trap lists, black lists, block lists, and Doman Name System Block Lists, and sources that may include positive associations, such as white lists. The ESP may determine, for example, whether one of the ten unverified domains is listed on one or more of the information sources. The ESP may store information from the information sources in a database to evaluate a domain to determine whether to send an email to an address from the domain. For example, the ESP may be less likely to send an email to an email address associated with a domain that is listed on a spam trap list or a black list, and more likely to send an email to an email address associated with a domain that is listed on a white list.

According to implementations of the disclosed subject matter, at step 103 registration records may be obtained and verified. Registration records, such as resource records from DNS, may be obtained for a domain, such as one of the ten unverified domains. The ESP may perform a WHOIS request for the domain to determine the domain's registrar. The domain's registrar may provide Name Server (NS) records associated the appropriate name servers to query for the domain. A transport request may be made against the appropriate name servers to obtain the full zone file for the domain. If the transport request is denied, other registration records, such as A, MX, SOA, TXT, and canonical name (CNAME) records, may be through standard lookup requests. For A and CNAME records, lookup requests for commonly used names may be used, such as, for example, 'mail', 'www', 'smtp', and '@'.

According to implementations of the disclosed subject matter, a mail server record for the domain may be queried against the white lists and black lists 104. The mail server record for the domain, which may be an MX record, may be queried against information sources regarding negative associations for the domain, such as spam databases, to determine whether the mail server record is on a Doman Name System Block List, is associated with a spam trap, and to ascertain other information commonly available the domain's email rating. The mail server record for the domain may be directed to a different domain, IP address range, or other environment that differs from the domain itself. The information obtained about the mail server record may differ from information obtained about the domain in step 102. For example, the ESP may, in step 102, query the domain against white lists and black lists. In step 103, the ESP may obtain a mail server record for the domain. For example, the mail server record for 'domainone.com' may be directed to 'domainone.com.s7b1.fsmtp.com', indicating that the mail server record for 'domainone.com' is associated with a third party domain 'fsmtp.com'. In step 104, the ESP may review the domain 'fsmtp.com' and the subdomain 'domainone.com.s7b1.fsmtp.com' against the white lists and black lists, for example, to determine if 'fsmtp.com' is on a black list or a white list.

According to implementations of the disclosed subject matter, a webpage associated with a domain may be retrieved at step 105. The ESP may retrieve an A or CNAME record associated with the 'WWW' DNS record for the domain. The ESP may then download a webpage, if one exists, from a location in the A or CNAME record. The webpage may be retrieved using suitable tools, such as, for example, a web browser, wget, curl, or other HTML extraction utilities. The webpage may be stored by the ESP for later review, for example, in a database, file server, file repository, cloud storage service, or any other file or information serving infrastructure.

According to one implementation of the disclosed subject matter, the webpage associated with a domain may be compared against a white list of domains and associated webpages at step 106. The webpage for the domain, retrieved in step 105, may be parsed and compared against websites associated with high-ranking whitelisted websites on publicly available or internally maintained spam lists. The ESP may review the webpage by parsing the webpage for commonly used words, known trademarks owned by whitelisted domains, images or scripts hosted by a third party or one or more whitelisted domains.

For example, a client may include in a recipient list an email address of 'user@domainonemail.com', and request that the ESP send an email, such as a marketing email, to the email address. The ESP may wish to verify and obtain information about the domain 'domainonemail.com', because the ESP may have not previously sent an email to an email address associated with that domain. The ESP may obtain registration records, such as DNS entries, for 'domainonemail.com', which may include a 'WWW' entry.

The ESP may determine that a website associated with 'www.domainonemail.com' redirects to 'mail.domainone.com'. The ESP may then be able to determine that 'www.domainonemail.com' is associated with a company DomainOne, which may be a well-known provider of internet hosted service.

As another example, a client may include in a recipient list an email address of 'user@fakewebsite.com' and request that the ESP send an email, for example, a marketing email, to the email address. The ESP may wish to verify and obtain information about the domain 'fakewebsite.com', as the ESP may have never sent an email to an email address associated with that domain. The ESP may obtain registration records, such as DNS entries, for 'fakewebsite.com', which may include a 'WWW' entry. The ESP may retrieve webpages from a website associated with 'www.fakewebstie.com', and compare the webpages to webpages from websites of known high-ranking whitelisted websites. The ESP may find a close match between the webpages from 'www.fakewebsite.com' and the webpages from 'www.domainone.com', as 'www.fakewebsite.com' may copy and download images from 'www.domainone.com'. The ESP may determine whether the website at 'www.fakewebsite.com' is associated with 'www.domainone.com' by reviewing information about the ownership of a domain, for example, WHOIS information, about the domain 'fakewebsite.com'. In the event that the ownership information for the domain 'fakewebsite.com' is not the same or similar to the ownership information for 'domainone.com', the ESP may determine that 'fakewebsite.com' is a malicious domain.

According to implementations of the disclosed subject matter, potential misspellings for a domain may be identified using a white list of known domains at step 107. The domain may be compared to a white list of known domains to determine whether the domain may be misspelled or may be associated with a fraudulent website. The ESP may compare the domain name to the known domain names using, for example, adding or deleting letters from the domain name, adding or removing phrase to the domain name, replacing words or phrases in the domain name with their commonly misspelled word or phrase counterparts, or using any other suitable comparison techniques. For example, a client may request that the ESP send an email to the email address 'user@dommainone.com'. The domain 'dommainone.com' may be compared against a white list of known domains, and may be determined to closely resemble the white listed domain 'domainone.com'.

According to one implementation of the disclosed subject matter, a strategy for sending an email may be determined at step 108. Information obtained by the ESP about the domain at steps 101, 102, 103, 104, 105, 106, and 107 may be used to determine a strategy for sending emails to the domain. The ESP may elect to send email to the domain through a secondary sending infrastructure that is separate and distinct from a network perspective from the ESP's primary sending infrastructure. The ESP may determine that the domain is risky, malicious, malformed, or improperly configured to receive email, and may send a subset of emails that the client requested be sent to email addresses associated with the domain using the secondary sending infrastructure that may be independent and distinct from the ESP's primary sending infrastructure. This may enable the ESP to directly test the email receiving capabilities of the domain without negatively impacting the email sender rating of the ESP's primary sending infrastructure. After the ESP determines that the subset of emails sent to the domain arrived successfully, the ESP may send the remaining emails requested to be sent to the email addresses associated with the domain.

The ESP may elect to send all email destined for domain through a secondary sending infrastructure that is separate and distinct from a network perspective from the ESP's primary sending infrastructure for a trial period of any suitable length. The ESP may gather more information about the domain without negatively impacting the email sender rating of its primary sending infrastructure. In the event that no issues arise from sending emails to the domain during the trial period, the ESP may then elect to send emails destined for the domain through its primary sending infrastructure.

The ESP may determine an email sending strategy that may request a second opt-in from recipients at the email addresses associated with the domain. The ESP may send an email to each email address associated with the domain. The emails may request that the recipient click a link within the email, respond to the email, or otherwise interact with the email in a manner that indicates the recipient wants to receive emails from client.

A client may request that the ESP send emails, for example, marketing emails, to one or more email addresses associated a domain to which the ESP has not previously sent email. The ESP may determine an email sending strategy that sends an email to each email address with a link asking the recipient of the email to verify that they wish to receive emails from the client. In the event that the recipient clicks on the link, the ESP may determine that the recipient has opted-in to receiving emails from the client, and thereafter, emails sent to the recipient's email address may be sent using the ESP's primary sending infrastructure.

The ESP may determine an email sending strategy that sends emails to all email addresses associated with the domain using the ESP's primary sending infrastructure. The ESP may also use any other suitable email sending strategy.

The ESP may not collect information about the domain for each of the steps 102, 103, 104, 105, 106, and 107. The ESP may determine an email sending strategy as in step 108 after any of the steps 102, 103, 104, 105, 106, and 107 if the ESP determines that enough information about the domain has been gathered such that an email sending strategy may be determined. For example, the ESP may obtain DNS records for a domain in step 103 and determine that the domain has no associated MX record. The ESP may decide not to send email to recipients with email addresses associated with the domain because any emails sent to such recipients will not actually arrive at any mailbox.

According to an implementation of the disclosed subject matter, an email may be sent at step 109. The ESP may send email in accordance with the email sending strategy determined in step 108. The ESP may send emails from the ESP's primary sending infrastructure and alternative or secondary email infrastructures, may send a subset of emails to test the domain, may send the totality of emails, or may send emails in any other suitable manner in accordance with the email sending strategy.

According to an implementation of the disclosed subject matter, a change in the behavior of the recipient of an email may be observed at step 110. The ESP may track activity associated with emails sent to recipients by the ESP. Activity may include, for example, opening emails, clicking links within emails, subsequently purchasing products form the links opened within emails, clicking advertisements within emails, and any other type of email tracking activity. The ESP may establish a baseline for each domain that may be associated with expected recipient behavior for email tracking activity. In the event that the ESP determines that there has been a change in recipient behavior from one or more established baselines or expected set of recipient activities associated with a domain, the ESP may elect to test the domain through, for example, the steps 101, 102, 103, 104, 105, 106, and 107, to verify that the domain is properly configured or gather more information about the domain before sending more email to recipients associated with the domain.

Figure 2:
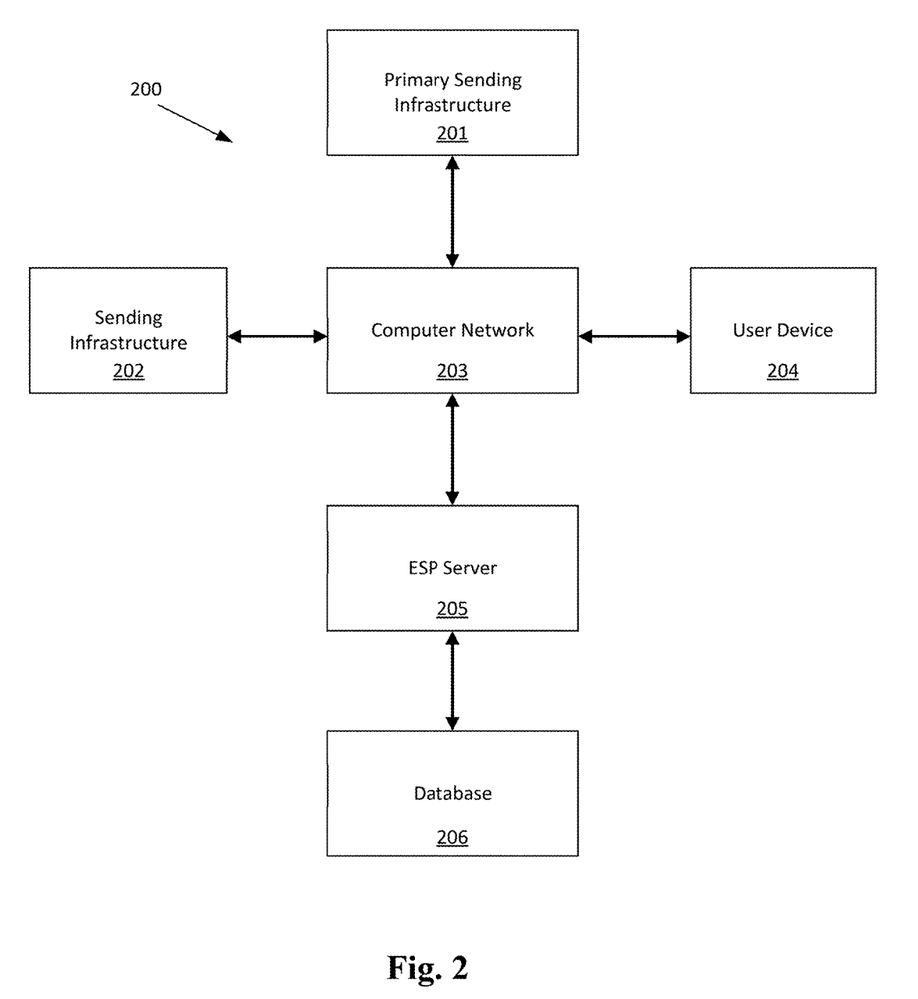
FIG. 2 shows an example system for evaluating domains according to an implementation of the disclosed subject matter.

FIG. 2 shows an example system for evaluating domains according to an implementation of the disclosed subject matter. A system 200 may include a primary sending infrastructure 201, a secondary sending infrastructure 202, a user device 204, an ESP server 205, a database 206, and a computer network 203. Only one user device 204 is depicted in FIG. 2, although the system 200 may have more than one user device 204 operating at the same time.

The ESP server 205 may be configured to identify a domain for verification and information gathering purposes, to build electronic messages, establish electronic messages, and send electronic messages, such as emails, or other communications to the user device 204 through the computer network 203. The ESP server 205 may access the database 206 to evaluate a domain and determine an email sending strategy. The ESP server 205 may perform any or all the steps 101, 102, 103, 104, 105, 106, 107, 108, 109, and 110.

The user device 204 may be configured to provide input or receive output to and from and the ESP server 205 in order to carry out one or more of the steps 101, 102, 103, 104, 105, 106, 107, 108, 109, and 110. The ESP server 205 may include one or more server computers, computing devices, or other such computing systems. The ESP server 205 may include any suitable software, hardware, and componentry, such as, for example, microprocessors, memory systems, input/output devices, device controllers and display systems. The ESP server 205 may be a single server, or may be number of servers or other computing devise interconnected by suitable hardware and software systems and which collectively can perform any suitable functions of the ESP server 205, such as, for example, the steps 101, 102, 103, 104, 105, 106, 107, 108, 109, and 110.

The database 206 may store registration records, such as DNS record information, webpages retrieved and evaluated, white lists and black lists, and any other information retrieved, obtained, or generated by the ESP server, for example, in accordance with any of the steps the steps 101, 102, 103, 104, 105, 106, 107, 108, 109, and 110. The database 206 may be associated with the ESP server 205. The database 206 may reside on the ESP server 205, or may reside on a server or computing device remote from the ESP server 205, provided that the remote server of computing device is capable of bi-directional data transfer with the ESP server 205. A remote server or computing device on which the database 206 resides may be electronically connected to the ESP server 205 and may be capable of continuous bi-directional data transfer with the ESP server 205.

The database 206 may be a single database, or may include a number of databases connected by any suitable software and hardware and capable of performing the functions of the database 206. The database 206 may include a relational database architecture or other suitable database architecture. The database 206 may retrievably store information, documents, and email tracking activity that is communicated to the database 206 from the user device 204, the ESP server 205, or through the computer network 203.

The primary sending infrastructure 201 and the secondary sending infrastructure 202 may include a communication sending infrastructure for relaying or sending electronic communications, such as, for example, emails, to the user device 204. The primary sending infrastructure 201 and the secondary sending infrastructure 202 may be, for example, server systems including various sizes of clusters of servers, with any suitable server architecture. The primary sending infrastructure 201 and the secondary sending infrastructure 202 may be in communication with communication sending relays to send electronic communications to the user device 204. The communication sending infrastructure may include, for example, servers running SMTP daemons, SMS gateways, MMS gateways, SMSC, MMSC, and other communication sending and relaying infrastructure. The primary sending infrastructure 201 and the secondary sending infrastructure 202 may reside in a computer network distinct from one another such that the IP address associated with primary sending infrastructure 201 is distinct from the IP address associated with the secondary sending infrastructure 202.

Each component in the system 200 may communicate with other electronically coupled components through the network 203. The network 203 may include, for example, the Internet, a WAN, LAN, private network, public network, or any other type of computer network. The communication between any component and another computing device may be bidirectional. The user device 204 may include any type of device capable of receiving a communication from an enterprise or retrieving a communication stored within a service provider where a communication is sent, such as, for example, a smartphone, PDA, tablet, gaming system, personal computer, laptop, and cell phone.

Implementations of the presently disclosed subject matter may be implemented and used with various communication platforms, which may be similar in architecture to email platforms, such as, for example, SMS and MMS communication platforms, group messaging applications, and social networking systems.

Figure 3:
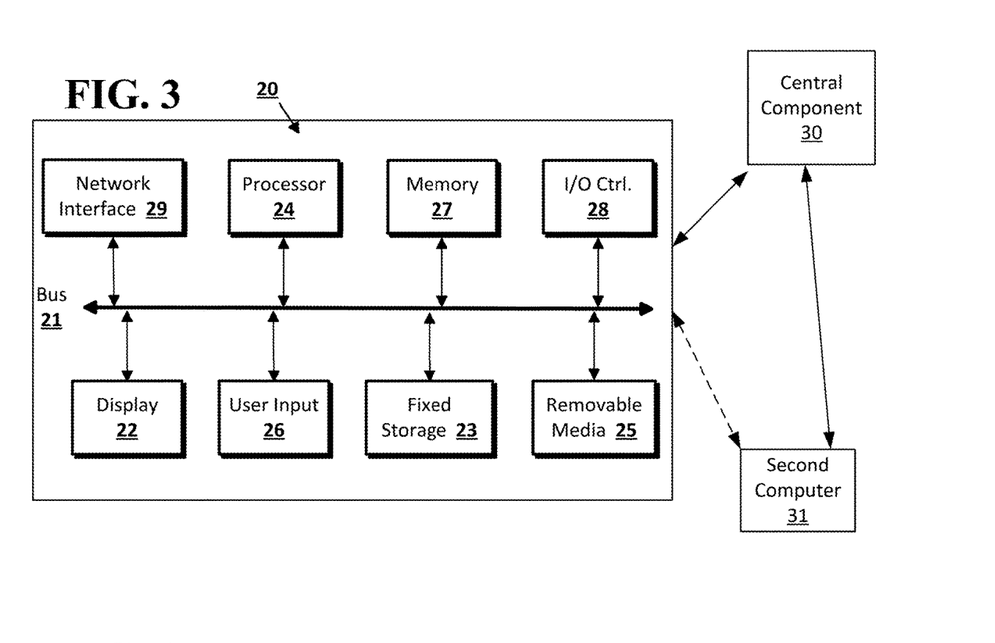
FIG. 3 shows a computer according to an implementation of the disclosed subject matter.

Implementations of the presently disclosed subject matter may be implemented in and used with a variety of component and network architectures. FIG. 3 is an example computer 20 suitable for implementing implementations of the presently disclosed subject matter. As discussed in further detail herein, the computer 20 may be a single computer in a network of multiple computers. As shown in FIG. 3, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 4.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
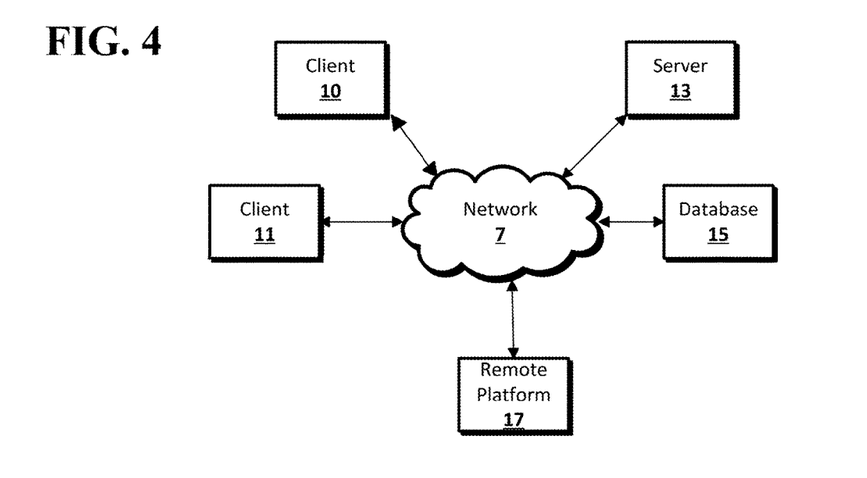
FIG. 4 shows a network configuration according to an implementation of the disclosed subject matter.

FIG. 4 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method for evaluating domains to send emails while maintaining sender reputation comprising:
    retrieving a plurality of registration records of a domain, wherein the registration records include a mail server record and one or more records linking the domain to one or more of another domain and an IP address;

verifying that the mail server record is associated with a second domain that is not on any of one or more black lists, wherein the second domain is either the domain or a different domain;

retrieving a webpage from a website associated with the one or more records linking the domain to one or more of another domain and an IP address;

comparing the webpage to webpages for websites that are on one or more white lists;

comparing ownership information for the webpage to ownership information for at least one other website that comprises a website that is on at least one of one or more white lists;

determining an electronic communications sending strategy based on at least one of the verifying that the mail server record is associated with the second domain that is not on any of the one or more black lists, the comparing of the webpage to webpages for websites that are on one or more white lists, and the comparing of ownership information for the webpage to ownership information for at least one other website that comprises a website that is on at least one of one or more white lists; and sending at least one electronic communication based on the electronic communications sending strategy, wherein the electronic communications sending strategy comprises:

sending an email to each email address of a subset of email addresses to which an email is to be sent using a secondary sending infrastructure distinct from a primary sending infrastructure, the secondary sending infrastructure associated with an IP address that is distinct from an IP address associated with the primary sending infrastructure, the subset of email addresses being associated with the domain, and the subset of email addresses being a subset of a set of all email addresses that are associated with the domain and to which an email is to be sent;

determining whether each of the emails arrived successfully at the email address to which each of the emails was sent; and responsive to the determining that each of the emails sent to an email address of the subset of email addresses arrived successfully, sending an email to each email address in the set of email addresses that was not in the subset of email addresses.

2. The computer-implemented method of claim 1, wherein the domain is a domain associated with an email address to which an email is to be sent.

3. The computer-implemented method of claim 1, wherein the registrations records are Domain Name Server (DNS) records.

4. The computer-implemented method of claim 1, wherein the one or more records linking the domain to one or more of another domain and IP address are Address (A) or Canonical Name (CNAME) records.

5. The computer-implemented method of claim 1, wherein the mail server record is an MX record.

6. The computer-implemented method of claim 1, wherein the one or more black lists include one or more of: spam lists, spam trap lists, block lists, and Doman Name System Block Lists.

7. The computer-implemented method of claim 1, wherein the sending of an email to each email address in the set of email addresses that was not in the subset of email addresses uses either the primary sending infrastructure or the secondary sending infrastructure.

8. The computer-implemented method of claim 1, further comprising observing changes in behavior of recipients of electronic communications.

9. The computer-implemented method of claim 8, wherein a change is observed when a behavior of recipients with email addresses associated with a domain for a tracking activity varies from a baseline for the tracking activity established based on recipients with email addresses associated with the domain.

10. The computer-implemented method of claim 9, wherein the tracking activity is opening emails, clicking links within emails, subsequently purchasing products from links opened within emails, or clicking advertisements within emails.

11. The computer-implemented method of claim 1, further comprising determining that electronic communication has not been successfully sent to an electronic communication address associated with the domain before retrieving the plurality of registration records for the domain.

12. The computer-implemented method of claim 1, further comprising identifying a potential misspelling of a name of the domain based on a comparison of the name of the domain to names of domains on a white list.

13. The computer-implemented method of claim 1, wherein the retrieving of the plurality of registration records comprises performing a WHOIS lookup on the domain.

14. The computer-implemented method of claim 1, wherein the verifying that the mail server record is associated with the second domain that is not on any of the one or more black lists further comprises verifying that a third party domain or a subdomain associated with the mail server record for the domain is not on any of the one or more black lists.

15. A system for evaluating domains to send emails while maintaining sender reputation, the system comprising:
a user device configured to receive email;
a primary sending infrastructure;
a secondary sending infrastructure;
a database, the database configured to store registration records, webpages, white lists, and one or more black lists; and
a host server electronically coupled to the database, the user device, the primary sending infrastructure, and the secondary sending infrastructure, the host server configured to:
retrieve a plurality of registration records of a domain, wherein the plurality of registration records include a mail server record and one or more records linking the domain to another domain or to an IP address;
verify that the mail server record is associated with a second domain that is not on any of the one or more black lists, wherein the second domain is either the domain or a different domain;
retrieve a webpage from a website associated with the one or more records linking the domain to another domain or to an IP address; and
compare the webpage to webpages for websites that are on one or more white lists;
compare ownership information for the webpage to ownership information for at least one other website that comprises a website that is on at least one of one or more white lists; and
determine an electronic communications sending strategy based on at least one of the verifying that the mail server record is associated with a second domain that is not on any of the one or more black lists, the comparing of the webpage to webpages for websites that are on one or more white lists, and the comparing of ownership information for the webpage to ownership information for at least one other website that comprises a website that is on at least one of one or more white lists, wherein the electronic communications sending strategy elects to send electronic communications through the primary sending infrastructure or the secondary sending infrastructure, wherein the host server is further configured to, in accordance with the electronic communications sending strategy:

send an email to each email address of a subset of email addresses to which an email is to be sent using the secondary sending infrastructure distinct from the primary sending infrastructure, the secondary sending infrastructure associated with an IP address that is distinct from an IP address associated with the primary sending infrastructure, the subset of email addresses being associated with the domain, and the subset of email addresses being a subset of a set of all email addresses that are associated with the domain and to which an email is to be sent;

determine whether each of the emails arrived successfully at the email address to which each of the emails was sent; and responsive to the determining that each of the emails sent to an email address of the subset of email addresses arrived successfully, send an email to each email address in the set of email addresses that was not in the subset of email addresses.

16. The system of claim 15, wherein the host server is further configured to send an email to each email address in the set of email addresses that was not in the subset of email addresses uses either the primary sending infrastructure or the secondary sending infrastructure.

17. The system of claim 15, wherein the host server is further configured to observe changes in behavior of recipients of electronic communications.

18. The system of claim 17, wherein a change is observed when a behavior of recipients with email addresses associated with a domain for a tracking activity varies from a baseline for the tracking activity established based on recipients with email addresses associated with the domain.

19. The system of claim 18, wherein the tracking activity is opening emails, clicking links within emails, subsequently purchasing products from links opened within emails, or clicking advertisements within emails.

* * * * *